Patented Sept. 4, 1945

2,384,400

UNITED STATES PATENT OFFICE 2,384,400

TERPENE RESINS

Alfred L. Rummelsburg, Wilmington, Del., assignor to Hercules Powder Company, Wilmington, Del., a corporation of Delaware No Drawing. Application April 6, 1942, Serial No. 437,842

13 Claims. (Cl. 260—92.6)

This invention relates to new resinous compositions of matter and to processes for their production. More particularly, it relates to resins prepared by the copolymerization of an acyclic terpene having three double bonds per molecule with 1,3-butadiene or a suitable derivative thereof.

In accordance with this invention, it has been found that acyclic terpenes having three double bonds per molecule may be copolymerized with various compounds having the following general formula:

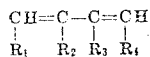

wherein $R_1$ is hydrogen, halogen or an alkyl radical of not more than 2 carbon atoms; $R_2$ is hydrogen, halogen, phenyl or an alkyl radical of not more than 7 carbon atoms; $R_3$ is hydrogen, halogen or an alkyl radical of not more than 7 carbon atoms; where $R_4$ is hydrogen or an alkyl radical of not more than 2 carbon atoms. The polymerization reaction will be carried out in the presence of a suitable catalyst and under suitable operating conditions to yield resinous materials which have many distinguishing characteristics over the resinous polymers of terpenes or mixtures thereof. These new copolymers are unusual in that they possess generally higher viscosities or melting points, as the case may be, than the resinous polymers produced by the polymerization of terpenes or terpene mixtures. Thus, it is possible in accordance with this invention to prepare products which are viscous liquids or solids having melting points as determined by the drop method of from about 20° C. up to about 160° C., preferably between about 50° C. and about 160° C. The average degree of polymerization of these new copolymers will be found to be substantially higher than that of products resulting when terpenes or terpene mixtures are polymerized under similar conditions.

One of the materials submitted to conditions of polymerization, in accordance with the invention, will be 1,3-butadiene or a suitable derivative thereof having the general formula hereinabove described. Thus, for example, there may be employed 1,3-butadiene; alkyl substituted 1,3-butadienes, such as (2-methyl-1,3-butadiene), (2,3-dimethyl-1,3-butadiene), (2-ethyl-1,3-butadiene), (2,3-diethyl-1,3-butadiene), (2-methyl-3-ethyl-1,3-butadiene), 2-propyl-1,3-butadiene), (2,3-dipropyl-1,3-butadiene), (2-methyl-3-propyl-1,3-butadiene), (2-ethyl-3-propyl-1,3-butadiene), (2-heptyl-1,3-butadiene), etc.; halogen substituted 1,3-butadienes, such as, (2-chloro-1,3-butadiene), (2-bromo-1,3-butadiene), (2-iodo-1,3-butadiene), (2,3-dichloro-1,3-butadiene), (2,3-dibromo-1,3-butadiene), (2,3-diiodo-1,3-butadiene), (2-chloro-3-bromo-1,3-butadiene), (1,2,3-trichloro-1,3-butadiene), etc.; phenyl substituted 1,3-butadienes, such as (2-phenyl-1,3-butadiene), etc.; alkyl and halogen substituted 1,3-butadienes, such as, (2-chloro-3-methyl-1,3-butadiene), (1-methyl-2-chloro-1,3-butadiene), (2-bromo-3-methyl-1,3-butadiene), 2-iodo-3-methyl-1,3-butadiene), (2-chloro-3,4-dimethyl-1,3-butadiene), etc. Other more highly unsaturated compounds, such as (3,4-dichloro-1,2,4,6-hexatetraene), (4-chloro-1,2,3,5-hexatetraene), and (1,4-dichloro-2,3,5-hexatriene) may be employed. If desired, a mixture of several of the above compounds may be employed instead of a single one in the copolymerization with a desired acyclic terpene.

The terpene constituent of the mixture submitted to polymerizing conditions will be an acyclic terpene having three double bonds per molecule, such as myrcene, ocimene, allo-ocimene, cryptotaenene. Hereinafter, an acyclic terpene having three double bonds per molecule will be referred to merely as an acyclic terpene. In place of pure acyclic terpenes or their synthetic mixtures, terpene mixtures rich in acyclic terpenes may be employed, such as, terpene mixtures resulting from the heat isomerization of alpha- and/or beta-pinene. When, for example, alpha-pinene is heated at elevated temperatures, it is possible to obtain products containing as much as 40% allo-ocimene along with substantial amounts of alpha-pinene, dipentene and other complex terpene products. Pyrolysis of beta-pinene yields terpene mixtures containing as much as 65% to 70% myrcene in conjunction with small amounts of 1-limonene and other terpenes.

In accordance with the present invention, a mixture of an acyclic terpene and 1,3-butadiene or a substitution product thereof, desirably in the presence of an inert solvent, is contacted with a polymerization or condensation catalyst at a temperature which promotes the copolymerization of the constituents for a period sufficiently long to secure a substantial yield of copolymerized product. Desirably, the reaction mixture will be vigorously agitated throughout the period of contact of the reactants with the catalyst.

The polymerization catalysts which will be employed in accordance with this invention can be categorized into four distinct groups. These groups comprise the metal halides of the well-known Friedel-Crafts type, such as, boron trifluoride and its molecular complexes with ethers and acids, titanium chloride, ferric chloride, and the halides of metals whose hydroxides are amphoteric, as aluminum chloride, stannic chloride, zinc chloride, or their complexes with alkali halides such as NaCl, etc.; acids, such as hydrofluoric acid, fluoroboric acid, polybasic mineral acids, as orthophosphoric acid, tetraphosphoric acid, sulfuric acid, etc.; acyl sulfuric acids, as acetyl sulfuric acid, alkyl sulfuric acids, as ethyl sulfuric acid, para-toluene sulfonic acid, etc.; activated clays, such as fuller's earth, diatomaceous earth, alumina, bauxite, synthetic magnesium silicates, etc.; peroxide catalysts, such as, benzoyl peroxide, acetyl peroxide, etc. For the acid catalysts, certain of their anhydrides, for example, phosphorus pentoxide, if they are available, may be equivalently employed. The activated clays will desirably be calcined at temperatures of, for example, from 100° C. to 500° C. prior to use.

In general, the catalyst to reactant ratio will vary between about 0.001 and about 1.0. The operable temperature will vary between about −60° C. and about 200° C. and the operable reaction period will vary between about 1 and about 400 hours. Moreover, it is preferred when a metal halide or acid catalyst is employed to use a catalyst to reactant ratio between about 0.02 and about 0.25, a reaction temperature between about −20° C. and about 80° C., and a reaction period between about 2 hours and about 24 hours. When an activated clay is employed as the catalyst, it is preferred to use a catalyst to reactant ratio between about 0.05 and about 0.25, a reaction temperature between about 80° C. and about 200° C., and a reaction period between about 6 and about 8 hours. When a peroxide catalyst is used, it is preferred to employ a catalyst to reactant ratio between about 0.001 and about 0.01, a reaction temperature between about 50° C. and about 150° C. and a reaction period between about 48 and about 400 hours. It has furthermore been found that the peroxide catalysts are in general operable only when the butadiene or substituted butadiene is present in the reaction mixture in substantially larger amounts than the acyclic terpene.

The use of a metal halide catalyst is preferred when the object is the production of resinous copolymers which are solid at room temperature. It is further preferred that the metal halide catalyst be employed in conjunction with an inert halogenated hydrocarbon solvent for the reactants. It has been found that when a metal halide catalyst is employed for the copolymerization in conjunction with an inert solvent, employing a catalyst to reactant ratio, a temperature and a reaction period within the broad operable ranges disclosed hereinabove, generally solid copolymers will result. It will be understood, however, that it is quite possible that solid copolymers may result from the employment of the other catalysts disclosed herein.

Generally, it is preferred to employ the acyclic terpene in an amount between about 5% and about 95% of the total weight of the reactants, with the butadiene or substitution product thereof being employed in a corresponding amount of between about 5% and about 95% of the total weight of the reactants. As the proportion of butadiene or substitution product thereof is increased, the resulting copolymers tend to have higher melting points and also show a decreasing solubility in drying and semi-drying oils. Generally, where the ratio of acyclic terpene to butadiene or substitution product thereof is 2.5 or greater, copolymer resins result which are soluble in drying and semi-drying oils. This will vary, however, depending upon the reaction conditions. Variations in the ratio of acyclic terpene to butadiene or substitution product thereof will influence the type of catalyst required to produce solid resins from the copolymerization. For example, the lower the aforesaid ratio the milder may be the polymerization catalyst. Thus, the acid catalysts, the activated clay catalysts, and the peroxide catalysts may be employed. As the ratio increases, however, the metal halides are required to obtain solid products.

The inert solvents which may be employed in accordance with this invention generally comprise any organic liquid which is inert to the reactants and catalyst employed. Thus, aliphatic hydrocarbons, such as gasoline, petroleum naphtha, butane, pentane, etc.; aromatic hydrocarbons, such as, benzene, toluene, xylene, etc.; cyclic hydrocarbons, such as cyclohexane, decahydronaphthalene, etc.; esters, such as, methyl acetate, ethyl acetate, propyl acetate, isopropyl acetate, n-butyl acetate, etc.; halogenated hydrocarbons, such as, chloroform, ethylene dichloride, carbon tetrachloride, trichloroethylene, ethyl chloride, methylene chloride, etc., may be employed. In conjunction with the use of metal halide catalysts, the halogenated hydrocarbon and the aromatic hydrocarbon solvents are preferred, with the halogenated hydrocarbons, such as, ethyl chloride and ethylene chloride, being most preferred. Oxygenated solvents, such as esters are the least preferable for general use.

Following the reaction period, the reaction mixture will be suitably treated to recover the copolymerization product as determined by the particular procedure employed in accomplishing the reaction. Thus, when a metal halide or acid catalyst has been employed, the catalyst may be removed by washing the reaction mixture with water or an aqueous alkali or an aqueous inorganic acid. The aqueous acid wash facilitates the removal of metal halide catalysts since it assists in decomposing catalyst-copolymer complexes. Following the alkali or acid wash, it is desirable to wash with water to remove all traces of alkali or acid. Furthermore, traces of dissolved catalyst and/or catalyst-copolymer complexes may be removed after water-washing by treatment with a suitable adsorbent, as Filter-Cel bauxite, Activated Alumina, activated magnesium silicate, fuller's earth, activated carbon, etc. Finally, the solvent, if one has been used, and any unreacted constituents will be removed, desirably by means of vacuum distillation using, if necessary, a final bath temperature of about 170 to 220° C. An alternative method for recovery of the copolymer after the catalyst has been removed is to dilute the reaction mixture with an organic liquid which is miscible with the inert solvent employed in the reaction but in which the copolymer is insoluble. After vigorous agitation, the copolymer is precipitated from the solution, often in the form of powder or granules. For example, ethyl alcohol or acetone may be so employed with many of the copolymers prepared in accordance with the invention.

When peroxides are used as catalysts, and the quantity of butadiene predominates in the reaction mixture, the polymerization may be carried out by emulsifying the mixture in water using a suitable emulsifying agent.

The color of the final products may be improved by utilizing acyclic terpenes which have been distilled from caustic. Also, the use of an inert atmosphere, such as, $CO_2$, $N_2$, etc., during the reaction leads to the production of pale-colored products. Other refining agents which may be employed include adsorbents hereinbefore mentioned, also selective solvents, such as, furfural, furfuryl alcohol, phenol, etc. If desired, the copolymer resins obtained in accordance with the processes described herein may be subjected to vacuum distillation to remove volatile copolymers, leaving copolymer residues having higher melting points than the initial copolymerization product.

The following specific examples are illustrative of the invention. All parts and percentages in the specification and claims are by weight unless otherwise indicated.

Example 1

Fifty parts of allo-ocimene (99% pure) and 20 parts of 2-chloro-1,3-butadiene were dissolved in 250 parts of ethyl chloride. Five parts of anhydrous aluminum chloride were added with agitation and cooling at −60° C. to −30° C. over a period of 0.74 hour. Agitation was continued at −60° C. to −40° C. for 2 hours. The reaction mixture was then added slowly to 700 parts of ethyl alcohol with vigorous agitation. A precipitate formed which was separated, thoroughly washed with ethyl alcohol and dried. The resulting copolymer resin was obtained in the amount of 62 parts, having a drop melting point of 130° C., and having a color of 3 Amber on the Lovibond color scale. The product contained 4% of combined chlorine.

Example 2

Fifty parts of myrcene (98% pure) and 30 parts of butadiene were dissolved in 300 parts of ethyl chloride at −20° C. The reaction mixture was cooled to −60° C. to −40° C. with agitation. About 4 parts of boron fluoride were adsorbed in the solution at −60° C. to −40° C. with agitation for one-half hour. Agitation was continued at −60° C. for a period of three hours. The reaction mixture was then slowly added to 1200 parts of 95% ethyl alcohol with vigorous agitation. A precipitate formed which was separated, washed with ethyl alcohol, and dried. The resulting copolymer resin was obtained in the amount of 62 parts, having a drop melting point of 95° C. and having a color of 5 Amber on the Lovibond color scale.

Example 3

One hundred parts of myrcene (98% pure) and 60 parts 2,3-dimethyl-1,3-butadiene were placed in a stainless steel electrically heated pressure autoclave with 30 grams of calcined (400° C.) fuller's earth. The mixture was vigorously agitated for a period of three hours at 120° C. After cooling, the reaction mixture was filtered from the catalyst and unreacted constituents then removed by vacuo distillation, using a final bath temperature of 120° C. and a pressure of 5 mm. About 120 parts of viscous oil having a thiocyanate number of 175 remained as residue. This resin had a color of I on the Lovibond color scale.

Example 4

Example 1 was duplicated replacing the 2-chloro-1,3-butadiene by 1,3-butadiene. The resulting copolymer resin was obtained in the amount of 52 parts, having a drop melting point of 85° C. and having a color of 5 Amber on the Lovibond color scale.

Example 5

A mixture of one hundred parts of allo-ocimene (100% pure), 50 parts of isoprene, and 150 parts of cyclohexane were agitated for a period of eight hours at 30° C. with 45 parts of 85% phosphoric acid. The reaction mixture was thoroughly washed to remove the phosphoric acid. The solvent and unreacted constituents were removed as in Example 3. There remained as residue 110 grams of viscous oil, having a thiocyanate number of 200, and having a color of I on the Lovibond color scale.

The resinous copolymers prepared in accordance with this invention are characterized by their having heavier viscosities or higher melting points, as the case may be, than the polymers prepared from various terpenes or terpene mixtures of the prior art. By employing the proper conditions, copolymers can be prepared which range in melting point from room temperature up to about 160° C. These solid resins have an extended scope of utility over terpene polymers which are generally found to be viscous oils and semi-solids at room temperature. The new copolymers of this invention show good resistance to water and to alkalies. These characteristics are also found in films formed from protective coatings containing these new resins. In this respect, they are markedly superior to protective coatings prepared from terpene polymers as the resin ingredient. Furthermore, protective coating compositions containing the resinous copolymers of this invention have improved drying characteristics, particularly when compared with those of compositions prepared from terpene polymers.

The films formed by the copolymer resins of this invention are characterized by being strong and somewhat improved in flexibility, and they adhere well to various surfaces, such as, wood, glass, paper, or metal. Hence, the resins are very useful in the form of their clear solutions in the lacquer, varnish and adhesive fields. They may also be used in the formulation of pigmented coating compositions, such as, paints and pigmented lacquers for wood, metal, paper, etc. Unpigmented solutions or emulsions of the copolymer resins are suitable for impregnating or coating paper, textiles, fibers, wood, etc., to contribute strength, etc., thereto.

The solubility characteristics of these new resins are such that they may be dissolved in common solvents, such as, gasoline, benzene, toluene, xylene, chlorinated aliphatic and aromatic hydrocarbons, terpenes, hydrogenated naphthalene, etc. They are only slightly soluble in solvents, such as, ethyl alcohol, acetone, dioxane, etc.

It will be understood that wherever in this specification reference is made to the melting point of a resinous material, a melting point as determined by the Hercules drop method is contemplated.

This application forms a continuation-in-part of my application Serial No. 398,108, entitled "Terpene resins."

What I claim and desire to protect by Letters Patent is:

1. A resinous product of the copolymerization of an acyclic terpene having three double bonds per molecule and a material having the general formula:

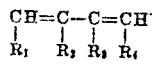

wherein $R_1$ is a member of the group consisting of hydrogen, halogen and alkyl radicals of not more than 2 carbon atoms; $R_2$ is a member of the group consisting of hydrogen, halogen, phenyl and alkyl radicals of not more than 7 carbon atoms; $R_3$ is a member of the group consisting of hydrogen, halogen and alkyl radicals of not more than 7 carbon atoms; and $R_4$ is a member of the group consisting of hydrogen and alkyl radicals of not more than 2 carbon atoms, said copolymerization being carried out in the presence of a metal halide catalyst of the Friedel-Crafts type at a temperature between about $-60°$ C. and about $+80°$ C. for a reaction period of from about 1 hour to about 400 hours and employing the terpene in an amount between about 5% and about 95% of the total weight of the reactants, said product characterized as being an alkali resistant resinous product having a melting point between about 50° C. and about 160° C.

2. A resinous product of the copolymerization of allo-ocimene and a material having the general formula:

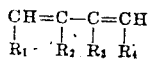

wherein $R_1$ is a member of the group consisting of hydrogen, halogen and alkyl radicals of not more than 2 carbon atoms; $R_2$ is a member of the group consisting of hydrogen, halogen, phenyl and alkyl radicals of not more than 7 carbon atoms; $R_3$ is a member of the group consisting of hydrogen, halogen and alkyl radicals of not more than 7 carbon atoms; and $R_4$ is a member of the group consisting of hydrogen and alkyl radicals of not more than 2 carbon atoms, said copolymerization being carried out in the presence of a metal halide catalyst of the Friedel-Crafts type at a temperature between about $-60°$ C. and about $+80°$ C. for a reaction period of from about 1 hour to about 400 hours and employing the terpene in an amount between about 5% and about 95% of the total weight of the reactants, said product characterized as being an alkali resistant resinous product having a melting point between about 50° C. and about 160° C.

3. A resinous product of the copolymerization of myrcene and a material having the general formula:

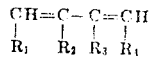

wherein $R_1$ is a member of the group consisting of hydrogen, halogen and alkyl radicals of not more than 2 carbon atoms; $R_2$ is a member of the group consisting of hydrogen, halogen, phenyl and alkyl radicals of not more than 7 carbon atoms; $R_3$ is a member of the group consisting of hydrogen, halogen and alkyl radicals of not more than 7 carbon atoms; and $R_4$ is a member of the group consisting of hydrogen and alkyl radicals of not more than 2 carbon atoms, said copolymerization being carried out in the presence of a metal halide catalyst of the Friedel-Crafts type at a temperature between about $-60°$ C. and about $+80°$ C. for a reaction period of from about 1 hour to about 400 hours and employing the terpene in an amount between about 5% and about 95% of the total weight of the reactants, said product characterized as being an alkali resistant resinous product having a melting point between about 50° C. and about 160° C.

4. A resinous product of the copolymerization of allo-ocimene and 2-chloro-1,3-butadiene, said copolymerization being carried out in the presence of a metal halide catalyst of the Friedel-Crafts type at a temperature between about $-60°$ C. and about $+80°$ C., for a reaction period of from about 1 hour to about 400 hours and employing the terpene in an amount between about 5% and about 95% of the total weight of the reactants, said product characterized as being an alkali resistant resinous product having a melting point between about 50° C. and about 160° C.

5. A resinous product of the copolymerization of allo-ocimene and 1,3-butadiene, said copolymerization being carried out in the presence of a metal halide catalyst of the Friedel-Crafts type at a temperature between about $-60°$ C. and about $+80°$ C., for a reaction period of from about 1 hour to about 400 hours and employing the terpene in an amount between about 5% and about 95% of the total weight of the reactants, said product characterized as being an alkali resistant resinous product having a melting point between about 50° C. and about 160° C.

6. A resinous product of the copolymerization of myrcene and 1,3-butadiene said copolymerization being carried out in the presence of a metal halide catalyst of the Friedel-Crafts type at a temperature between about $-60°$ C. and about $+80°$ C., for a reaction period of from about 1 hour to about 400 hours and employing the terpene in an amount between about 5% and about 95% of the total weight of the reactants, said product characterized as being an alkali resistant resinous product having a melting point between about 50° C. and about 160° C.

7. The process which comprises copolymerizing a mixture of an acyclic terpene having three double bonds per molecule and an unsaturated material having the general formula:

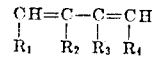

wherein $R_1$ is a member of the group consisting of hydrogen, halogen and alkyl radicals of not more than 2 carbon atoms; $R_2$ is a member of the group consisting of hydrogen, halogen, phenyl and alkyl radicals of not more than 7 carbon atoms; $R_3$ is a member of the group consisting of hydrogen, halogen and alkyl radicals of not more than 7 carbon atoms; and $R_4$ is a member of the group consisting of hydrogen and alkyl radicals of not more than 2 carbon atoms, in the presence of a metal halide catalyst of the Friedel-Crafts type, at a temperature between about $-60°$ C. and about $+80°$ C. for a reaction period of from about 1 hour to about 400 hours and employing the terpene in an amount between about 5% and about 95% of the total weight of the reactants.

8. The process which comprises copolymerizing a mixture of an acyclic terpene having three double bonds per molecule and an unsaturated material having the general formula:

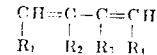

wherein $R_1$ is a member of the group consisting of hydrogen, halogen and alkyl radicals of not more than 2 carbon atoms; $R_2$ is a member of the group consisting of hydrogen, halogen, phenyl and alkyl radicals of not more than 7 carbon atoms; $R_3$ is a member of the group consisting of hydrogen, halogen and alkyl radicals of not more than 7 carbon atoms; and $R_4$ is a member of the group consisting of hydrogen and alkyl radicals of not more than 2 carbon atoms, in the presence of a metal halide of the Friedel-Crafts type, at a temperature between about $-20°$ C. and about $+80°$ C. for a reaction period of from about 2 hours to about 24 hours and employing the terpene in an amount between about 5% and about 95% of the total weight of the reaction.

9. The process which comprises copolymerizing a mixture of an acyclic terpene having three double bonds per molecule and an unsaturated material having the general formula:

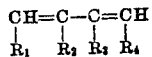

wherein $R_1$ is a member of the group consisting of hydrogen, halogen and alkyl radicals of not more than 2 carbon atoms; $R_2$ is a member of the group consisting of hydrogen, halogen, phenyl and alkyl radicals of not more than 7 carbon atoms; $R_3$ is a member of the group consisting of hydrogen, halogen and alkyl radicals of not more than 7 carbon atoms; and $R_4$ is a member of the group consisting of hydrogen and alkyl radicals of not more than 2 carbon atoms, both of which reactants are dissolved in an inert solvent, in the presence of a metal halide catalyst of the Friedel-Crafts type, at a temperature between about $-20°$ C. and about $+80°$ C. for a reaction period of about 1 hour to about 400 hours and employing the terpene in an amount between about 5% and about 95% of the total weight of the reaction.

10. The process which comprises copolymerizing a mixture of an acyclic terpene having three double bonds per molecule and an unsaturated material having the general formula:

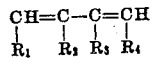

wherein $R_1$ is a member of the group consisting of hydrogen, halogen and alkyl radicals of not more than 2 carbon atoms; $R_2$ is a member of the group consisting of hydrogen, halogen, phenyl and alkyl radicals of not more than 7 carbon atoms; $R_3$ is a member of the group consisting of hydrogen, halogen and alkyl radicals of not more than 7 carbon atoms; and $R_4$ is a member of the group consisting of hydrogen and alkyl radicals of not more than 2 carbon atoms, both of which reactants are dissolved in an inert chlorinated solvent, in the presence of anhydrous aluminum chloride, at a temperature between about $-20°$ C. and about $80°$ C. for a reaction period of from about 2 hours to about 24 hours, and employing the terpene in an amount between about 5% and about 95% of the total weight of the reaction.

11. The process which comprises copolymerizing a mixture of allo-ocimene and 1,3-butadiene, both of which reactants are dissolved in ethylene dichloride in the presence of anhydrous aluminum chloride, at a temperature between about $-20°$ C. and about $80°$ C. for a reaction period of from about 2 hours to about 24 hours, and employing the allo-ocimene in an amount between about 5% and about 95% of the total weight of the reaction.

12. The process which comprises copolymerizing a mixture of myrcene and 1,3-butadiene, both of which reactants are dissolved in ethyl chloride in the presence of boron trifluoride at a temperature between about $-20°$ C. and about $80°$ C. for a reaction period of from about 2 hours to about 24 hours, and employing the myrcene in an amount between about 5% and about 95% of the total weight of the reaction.

13. The process which comprises copolymerizing a mixture of allo-ocimene and 2-chloro-1,3-butadiene, both of which reactants are dissolved in ethylene dichloride, in the presence of anhydrous aluminum chloride, at a temperature between about $-20°$ C. and about $+80°$ C. for a reaction period of from about 2 hours to about 24 hours, and employing the allo-ocimene in an amount between about 5% and about 95% of the total weight of the reactants.

ALFRED L. RUMMELSBURG.